United States Patent
Romine

Patent Number: 5,942,091
Date of Patent: Aug. 24, 1999

[54] ELECTROLYTIC CELL SEALING MEANS

[75] Inventor: Richard L. Romine, Concord, Ohio

[73] Assignee: OxyTech Systems, Inc., Chardon, Ohio

[21] Appl. No.: 08/965,972

[22] Filed: Nov. 7, 1997

[51] Int. Cl.$^6$ .............. C25B 9/00; C25B 13/08; C25B 15/00

[52] U.S. Cl. ............ 204/265; 204/277; 204/279; 204/296

[58] Field of Search .................. 204/279, 266, 204/265, 277, 296

[56] References Cited

U.S. PATENT DOCUMENTS

| | | |
|---|---|---|
| 3,859,196 | 1/1975 | Ruthel et al. . |
| 3,904,504 | 9/1975 | Ruthel et al. . |
| 4,178,225 | 12/1979 | Ruthel et al. . |
| 4,606,805 | 8/1986 | Bon . |
| 4,654,134 | 3/1987 | Morris et al. ............... 204/279 X |
| 4,721,555 | 1/1988 | Grosshandler ............... 204/279 X |
| 4,853,101 | 8/1989 | Hruska et al. . |
| 4,898,653 | 2/1990 | Morris ........................ 204/279 X |
| 5,183,545 | 2/1993 | Branca et al. . |
| 5,188,712 | 2/1993 | Dilmore et al. . |

OTHER PUBLICATIONS

Thomas F. Florkiewicz Long Life Diaphragm Cell Society of Chemical Industry, London Symposium, Jun. 5, 1997.

*Primary Examiner*—Donald R. Valentine
*Attorney, Agent, or Firm*—John J. Freer; David J. Skrabec; Michele M. Tyrpak

[57] ABSTRACT

There is disclosed a cell sealing mean particularly for a chlor-alkali diaphragm cell. The sealing means will usually be contained along a rim portion at the outer edge of an electrode assembly of the diaphragm cell. The sealing means comprises a pneumatic gasket system. In one embodiment, the system can have an outer gasket member comprising a solid and thick, elongated elastomeric strip element. The strip element will generally have front and back major faces, with the front face containing a channel, and with a side face typically having a flange. Combined with the outer gasket member in this embodiment is an inner gasket member that is a thin, elongated elastomeric strip member. It has an inflatable hollow and flexible tube element forming at least a portion of the inner gasket member. It is desirable that the element be a laminate of differing laminate materials. As a second embodiment, the sealing means comprises a gasket member of a thick, elongated strip element having a major cavity extending in the length dimension of the element. A stem connector, for providing and regulating fluid flow, can be provided with the tube element of the first embodiment or the cavity of the second embodiment.

25 Claims, 2 Drawing Sheets

ELECTROLYTIC CELL SEALING MEANS

FIELD OF THE INVENTION

An electrolytic cell, particularly a chlor-alkali diaphragm cell, is now provided with an improved and long-life sealing means for sealing the cell top and/or bottom to the cell walled enclosure.

BACKGROUND OF THE INVENTION

Electrolytic cells are generally placed in commercial use for the production of chlorine, chlorates, chlorites, hydrochloric acid, hydrogen and other related chemicals, such as caustic solutions. Over the years, electrolytic diaphragm cells have undergone continuous development, e.g., improved operating efficiencies and improved lifetimes for cell components. This is often accomplished by continual design improvements.

Generally, such electrolytic diaphragm cells, and most particularly those designed to operate as chlor-alkali diaphragm cells, will contain a removable top which, upon removal, separates from a walled enclosure or shell. This enclosure, or shell, will typically rest upon a supportive cell base. The removable cell top, often a corrosion resistant plastic top, is seated at the top of the walled enclosure. At this juncture of the top with the walled enclosure, there is need for a tight seal by means of a sealing gasket. The same situation also exists at the juncture of the walled enclosure with the cell base.

For example, in U.S. Pat. No. 4,178,225, there is disclosed an electrolytic diaphragm cell and particularly such a cell operating as a chlor-alkali diaphragm cell. As disclosed in this patent, the cell contains the corrosion resistant plastic top, a cathode walled enclosure and a cell base. The cathode walled enclosure is positioned on the cell base and secured thereto by fastening means. The cathode top is positioned at the top of the walled enclosure and secured thereto by fastening means. The seal between the cell top and the cathode walled enclosure is maintained by means of a sealing gasket. Between the cell base and the walled enclosure, there is an elastomeric sealing pad.

As cell design improvements continue, individual cell components are providing longer and longer operating life. For some electrolytic diaphragm cells, the internal parts, e.g., the electrodes and the diaphragm, can now have a longer operating life than the cell sealing means. It is thus becoming of greater concern to provide a sealing means, such as between the cell top, or the cell base, or both, and the walled enclosure, that can achieve the long operating life of internal cell elements.

SUMMARY OF THE INVENTION

A diaphragm cell sealing means for sealing the cell top and/or the cell base to the walled enclosure, which sealing means provides enhanced operating life, has now been developed. The sealing means, in addition to having extended life, also provides for highly desirable and efficient sealing. Such sealing means further offers the advantages of sealing adjustment. The sealing pressure between the walled enclosure and one or both of the cell top and the cell base during its operating life can now be adjusted so as to compensate for variations in cell operations. The sealing means additionally offers the advantage of being readily retrofittable to existing electrolytic diaphragm cells as well as being easily adaptable to new cell construction.

In one aspect, the invention is directed to an electrolytic cell, wherein an electrode assembly is contained in an enclosure comprising a gasketed outer wall member, the improvement in such assembly comprising an outer wall member sealed by a pneumatic gasket system which comprises, in combination:

an outer gasket member comprising an at least substantially solid, thick and elongated elastomeric strip element having front and back major faces, with the front face containing a channel along the length dimension of the strip element;

an inner gasket member comprising an elongated elastomeric strip member having an inflatable, hollow and flexible tube element extending in the length dimension of the strip member; and with the inner gasket member situated in the channel of the outer gasket member.

In another aspect, the invention is directed to such a cell as hereinabove described, with generally the hereinbefore detailed improvement, but which further includes a hollow and flexible laminated tube element that has an inner laminate member and a different outer laminate member.

In yet another aspect, the invention is directed to a pneumatic gasket system outer gasket member for an electrolytic cell, such outer gasket member comprising an at least substantially solid, thick and elongated elastomeric strip element having front and back major faces, with the front face containing a channel along the length dimension of said strip element.

In a still further aspect, the invention is directed to the aforedescribed outer gasket member, with or without the channel, but having uneven front and back major faces and a flange, which faces comprise elongated ribs spaced apart one from the other along the length dimension of these faces, and which flange extends away from a major face at a side of the outer gasket member.

In another aspect, the invention is directed to an electrolytic cell, wherein an electrode assembly is contained in an enclosure comprising a gasketed outer wall member, with the pneumatic gasket system comprising a gasket member that is a thick and elongated, flexible elastomeric strip element having front and back major faces, with an elongated and inflatable cavity within the strip element that extends in the length dimension of the strip element.

DESCRIPTION OF THE PREFERRED EMBODIMENTS

The electrolytic cells using the pneumatic gasket system of the present invention can be cells that are useful for the electrolysis of a dissolved species contained in a bath, such as in electrolyzers employed in a chlor-alkali cell to produce chlorine and caustic soda. The electrolytic cells can also be useful to produce products such as potassium hydroxide or sulfuric acid, e.g., can be utilized for the splitting of salts, such as sodium chlorate and sodium sulfate, to regenerate acid and base values. Other uses include electrolytic destruction of organic pollutants, water electrolysis, electro-regeneration of catalytic intermediates, and electrolysis of sodium carbonate.

The cells will usually have a plastic top, e.g., a top of fiber reinforced polyester or polydicyclo-pentadiene. The shell, or walled enclosure, can be of a metal resistant to attack by the electrolyte in the cell. Steel is typical, but nickel and stainless steel can be advantageously used and valve metals such as titanium, which may be coated as with a platinum group metal, may be utilized. The anodes of the cell will most always be valve metals, including titanium, tantalum, aluminum, zirconium and niobium. Representative metals for the cathodes include nickel or steel.

Figure 1:
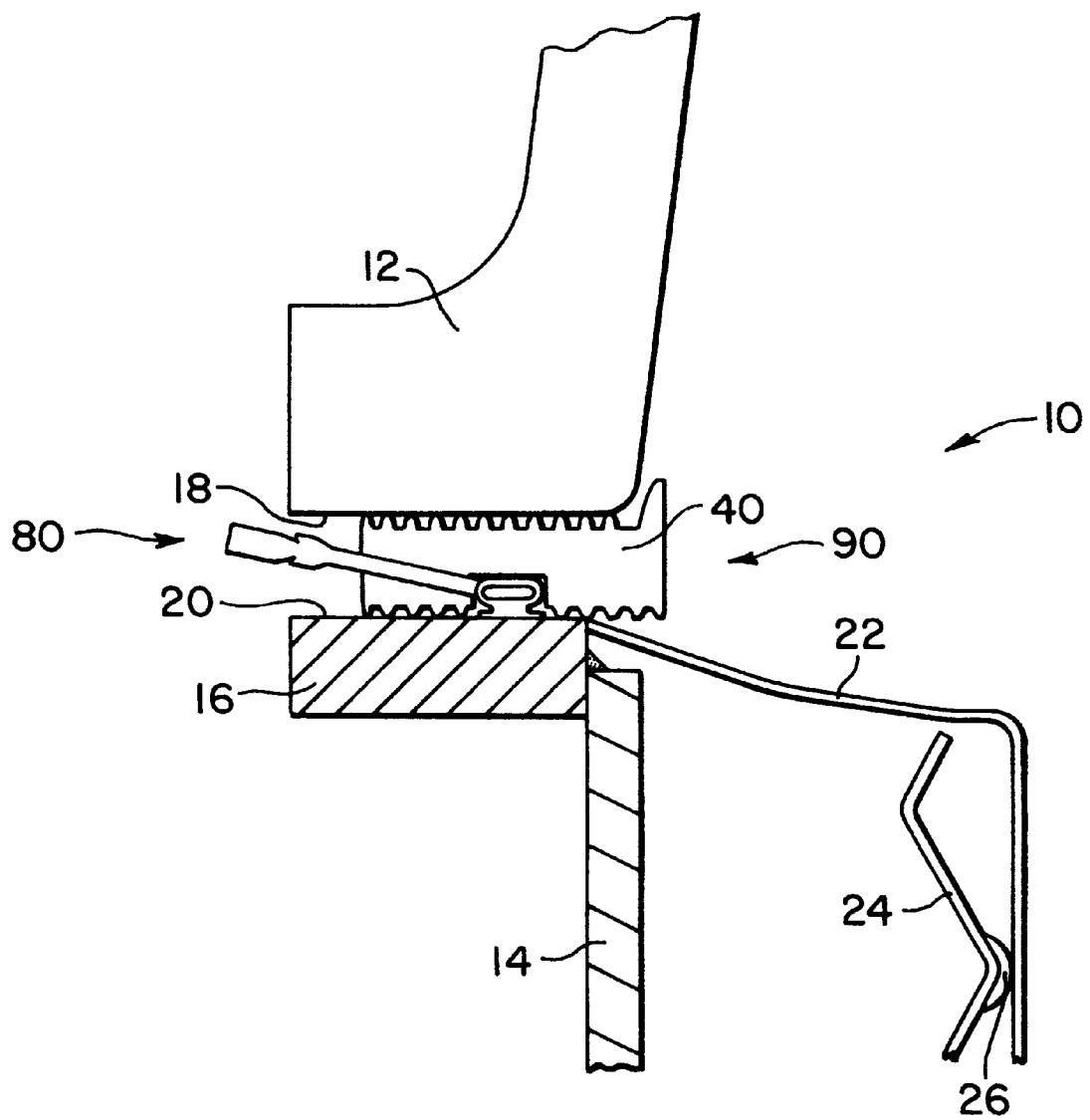
FIG. 1 is a partial sectional side elevation view of an electrolytic diaphragm cell showing a sealing means between a cell top and cell side wall.
Figure 3:
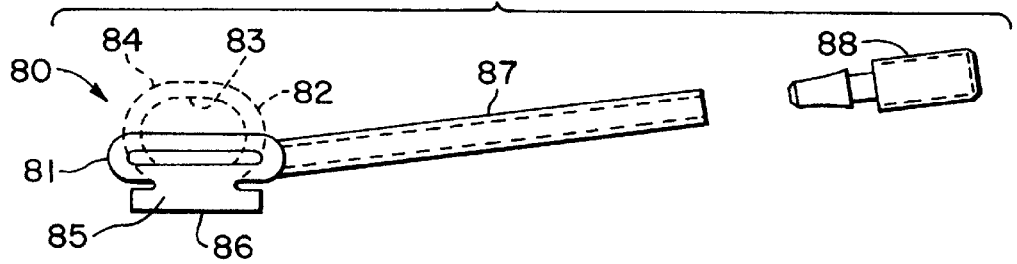
FIG. 3 is a sectional view of an inner gasket member assembly including a flow tube connector, with valve means shown in exploded view, such inner gasket assembly being useful in conjunction with the outer gasket member of FIG. 2 for providing a gasket system of the present invention.
Figure 4:
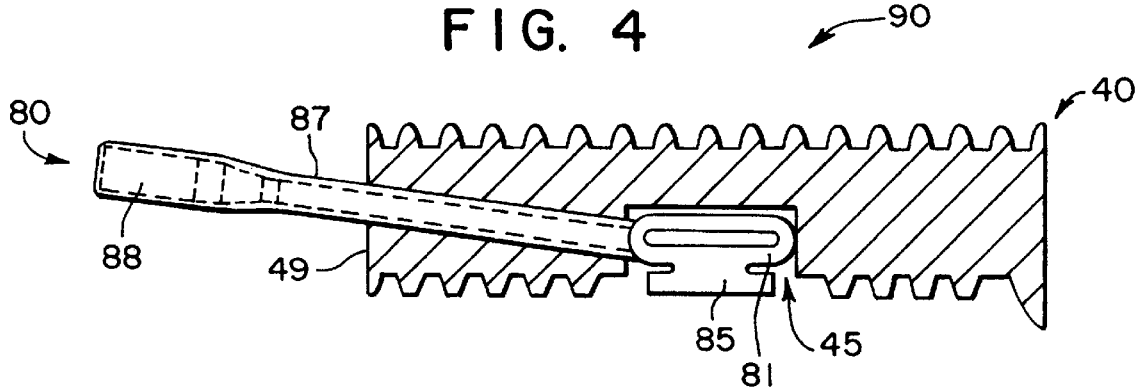
FIG. 4 is an assembled gasket system of the present invention employing the outer gasket member of FIG. 2 combined with the inner gasket member assembly of FIG. 3.

FIG. 1 depicts elements of a representative electrolytic diaphragm cell, including a pneumatic gasket system of the present invention, but should not be construed as limiting the invention. Referring to FIG. 1, an electrolytic diaphragm cell 10 has a cell top 12 and a cell housing comprised of a cell wall 14 and a cell wall flange 16. The cell top 12 is usually a plastic top, as has been discussed hereinbefore, and the cell wall 14 and flange 16 are typically of a metal such as steel. The cell top 12 has a bottom surface 18 opposed by a top surface 20 of the cell wall flange 16. Between these top and bottom surfaces 20, 18 is a pneumatic gasket system 90 (FIG. 4). This system 90 is comprised of an outer gasket member 40 and an inner gasket member 80 (FIG. 3). Enclosed within the cell wall 14, and positioned below the pneumatic gasket system 90, is a cathode rim screen 22 to support a diaphragm (not shown). Enclosed within this rim screen 22 is a cathode tube support 24. This tube support 24 contacts the rim screen 22 at dimples 26. The rim screen 22, tube support 24 and dimples 26 are generally always metallic in construction e.g., they can be steel elements.

Figure 2:
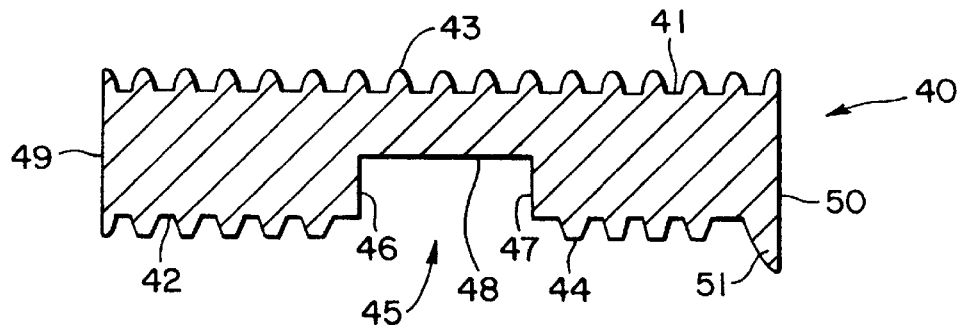
FIG. 2 is a sectional view of an outer gasket member for a gasket system of the present invention, and useful for sealing between a cell top, and/or a cell bottom and a cell side wall.

Referring then to FIG. 2, there is depicted an outer gasket member 40 which is representative of outer gasket member 40 of the present invention. This is a solid and thick, elongated outer gasket member 40. By being elongated, it is meant that this member 40 is intended to seal around the entire periphery of a cell between the cell top 12 and the cell wall 14. This member 40 has smooth sides 49, 50, a back face 41 and a front face 42. The thickness dimension of this member 40 is between these faces 41, 42 and its width dimension is between the sides 49, 50. As opposed to the smooth sides 49, 50, both faces 41, 42 are uneven faces, the unevenness being supplied by ribs 43 on the back face 41 as well as ribs 44 on the front face 42. These ribs 43, 44 are spaced apart one from the other and are positioned parallel to one another. Additionally, the front face 42 contains a channel 45 having channel sides 46, 47 and a channel bottom 48. The channel 45 is recessed about half-way into the thickness of this representative gasket member 40. The outer gasket member 40 at one side 50 has an overhang, or flange, 51. This side 50 may then be referred to herein as the "flange side" 50. The flange 51 extends along the side 50 away from the front face 42. The flange 51 may extend away, for example, in an upward manner (FIG. 1) or it can extend downwardly, i.e., toward a rim screen 22 when present in the combination depicted in FIG. 1.

Referring then to FIG. 3, there is depicted a representative inner gasket member 80 having a hollow and flexible tube element 81. The hollow and flexible tube element 81 is shown deflated in solid line and as an inflated element 82 by dashed line. Referring more particularly to the inflated element 82, the element 82 contains an inner element surface 83 and an outer element surface 84. In association with the hollow tube element 81, the inner gasket member 80 also has a flange element 85 or "foot" 85. For this representative gasket member 80, the foot 85 has a smooth bottom surface 86. The inner gasket member 80 as depicted in FIG. 3 also includes a tube connector 87. The tube connector 87 is equipped with a valve means 88 (shown in exploded view in association with the tube connector 87 in the FIG. 3).

Referring next to FIG. 4, there is then depicted a pneumatic gasket system 90 that is representative of the present invention for use in the electrolytic cell 10 of FIG. 1. The assembly 90 contains the outer gasket member 40 of FIG. 2 in combination with the inner gasket member 80 of FIG. 3. In this pneumatic gasket system 90, the inner gasket member hollow and flexible tube element 81, with its associated foot 85, is then incorporated within the channel 45 of the outer gasket member 40. For this representative system 90, the hollow and flexible tube element 81 is contained within the channel 45 and the foot 85 protrudes, at least partially, outside of the channel 45. Protruding through a side edge 49 of the outer gasket member 40 is the tube connector 87 connected to the hollow and flexible tube element 81 of the inner gasket member 80. This tube connector 87 is further in assembly with a valve means 88.

This pneumatic gasket system 90 of the FIGS. 2–4 is typically considered as a two-piece system, i.e., the outer gasket member 40 and the inner gasket member 80. Also, these members 40, 80 should virtually always be coextensive in length. However, it is contemplated that the various elements may be bonded or formed together in a manner as to provide the appearance of a one-piece system. Such a system is contemplated to be a part of the present invention. However, a preferred one-piece system has been disclosed in FIG. 5. This system of FIG. 5 will be particularly discussed further on hereinbelow after the further discussion of the FIGS. 2–4 system that now follows. Whether as a one-piece or two-piece system, it is contemplated that they will seal completely around the juncture for sealing, e.g., a cell top and walled enclosure.

In assembly, after the channel 45 has been cut in the outer gasket member 40, the hollow and flexible tube element 81 of an inner gasket member 80 can be inserted within the channel 45. As an alternative to being cut, or together with cutting, the channel 45 may be otherwise formed in the outer gasket member 40, e.g., by molding or extrusion. This tube element 81 may already be connected with a tube connector 87. Accordingly, there can be present in the outer gasket member 40 an aperture, e.g., a bored hole, so that when the tube element 81 is inserted within the channel 45, the tube connector 87 is at the same time extended through the aperture in the outer gasket member 40. In this regard, the tube connector 87 may be a flexible connector, but it is contemplated that the connector 87 may also be rigid. When the tube element 81 and connector 87 are in place, the valve means 88 can then be inserted into the outer, protruding end of the tube connector 87. The assembled pneumatic gasket system 90 can then be placed on the top surface 20 of a cell wall flange 16. In this assembly, the bottom surface 85 of the inner gasket member foot 85 can rest on the top surface 20 of the cell wall flange 16. The ribs 44 on the front face 42 of the outer gasket member 40 will also be in contact with this flange top surface 20.

On assembly of the cell 10, fluid, e.g., a liquid such as water or a compressed gas such as air, feeding from a source not shown, can be provided through the valve means 88 and tube connector 87 to the hollow and flexible tube element 81. On expansion of the tube element 81 (FIG. 3), the outer tube element surface 84 will be compressed against the channel bottom 48 of the outer gasket member 40. Similarly, the outer surface 84 of the tube element 81 may be compressed against the channel sides 46, 47. By this inflation of the hollow and flexible tube element 81, there is further produced an expansion of the outer gasket member 40, such that this member 40 exerts increased sealing pressure on the cell wall flange 16 as well as on the bottom surface 18 of the cell top 12.

Figure 5:
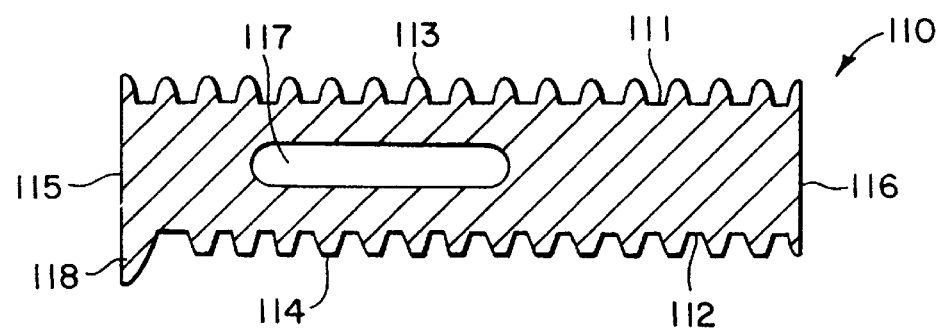
FIG. 5 is a sectional view of a variation of a gasket sealing means of the present invention that is also useful for sealing between the cell top and/or bottom and cell side wall as depicted in FIG. 1.

Referring then to FIG. 5, there is shown a variation sealing system. In FIG. 5, a gasket sealing means 110 has a back face 111 and a front face 112. The back face 111 is an uneven back face 111 containing ribs 113. Likewise, there are ribs 114 providing an uneven front face 112. The sealing means sides 115, 116, as shown in the figure, can have smooth faces. The sealing means 110 also contains a large internal cavity 117 which preferably extends completely throughout the length dimension of the sealing means 115. This cavity 117 is utilized for receiving fluid, e.g., compressed air. To this end, the cavity 117 can be connected through a combination of a valve means and tube connector (not shown) as is the case for the valve means 88 and tube connector 87 for the hollow and flexible tube element 81 (FIG. 3). It will be understood that the gasket sealing means 110 will have some means for providing fluid to the cavity 117, since this gasket sealing means 110 has no specifically separate inner gasket member 80 (FIG. 3). Nevertheless, this gasket sealing means 110 of FIG. 5 may for convenience be referred to herein as a "one-piece" system. In contrast with this, the pneumatic gasket system 90 of the FIGS. 2–3 may be conveniently referred to herein as the "two-piece" system. This gasket sealing means 110 also has an overhang or flange 118 that extends away from the front face 112 at a gasket sealing means side 115.

When the gasket sealing means 110 of FIG. 5 has a fluid such as compressed air fed to the cavity 117, this can provide for inflation of the gasket sealing means 110. As the gasket sealing means expands, the back face ribs 113 can exert increased sealing pressure on the bottom surface 18 of a cell top 12. Simultaneously, such expansion can provide for exerting increased sealing pressure from the front face ribs 114 onto a cell wall flange 16.

Either the one-piece or two-piece systems 90, 110 provide for not only increasing or decreasing the pressure of the gasket seal, but also provides for the monitoring of sealing pressure. Thus, typically in extended cell operation, the fluid pressure exerted on the hollow and flexible tube element 81 or the cavity 117 can be increased to maintain a desirable assembly seal. Also during cell assembly and/or operation, a flange 51, 118 of the outer gasket member 40, or of the gasket sealing means 110, may move against the inner surface of the cell top 12. For example, in cell operation, internal gas pressure or hydraulic pressure from cell electrolyte can be generated. This can aid in providing an enhanced sealing effect for the pneumatic gasket system 90 and the gasket sealing means 110 in the cell 10. Thus, the two-piece system 90 or the one-piece sealing means 110 can take advantage of cell pressure, e.g., gas pressure or hydraulic pressure or both, as well as from applied pressure to the hollow and flexible tube 81 or cavity 117 to provide an enhanced seal for the cell 10.

Where either the two-piece gasket system 90 or one-piece sealing means 110 will be required to extend around sharp corners, e.g., those approaching 90° bends, it is desirable that the outer gasket member 40, or gasket sealing means 110, have vulcanized joints. These joints assist in maintaining an enhanced gasket sealing even during extended cell operation. To aid in providing these vulcanized joints, it is preferred that the outer gasket member 40, or the means around the cavity 117, be a "solid" member. By this, as the word is used herein, it is meant that this member will preferably be foam free, although it will be understood that some foam structure, e.g., casual air entrapment during manufacture of the member, may be acceptable.

In this regard, the outer gasket member 40, or the sealing means 110, are each advantageously an elastomeric strip that is an elastomer having a durometer hardness generally in the range from about 20 to about 60. Elastomeric materials having a high durometer hardness above about 60 can exhibit sufficient stiffness as will not provide a leak-free seal. Preferably, for best sealing, the material will have a durometer hardness of from about 20 to about 25. Suitable materials of the requisite durometer hardness for providing the elastomeric strip element of either the outer gasket member 40 or the gasket sealing means 110, as well as being material that can have desirable resistance to degradation from the electrolyte of the cell, include neoprene, ethylene-propylene terpolymer, polyproylene and natural rubber, as well as blends of the foregoing.

The outer gasket member 40, as well as the gasket sealing means 110, particularly as depicted in the figures, are "thick" strips. In this regard, they will typically have a ratio of strip width to strip thickness on the order of about 3:1. However, other ratios are contemplated, e.g., those within the range from about 2:1 to about 5:1. In cross section, the outer gasket member 40 and sealing means 110 will typically be essentially rectangular in configuration, as has been depicted in the figures. In this regard, they will generally be wider, in association with their thickness, and can be expected to be extremely elongated, thereby being in the nature of a strip element. Owing to the inflatable nature of the cavity 117 in the sealing means 110, as well as to the presence of the cavity itself, this means 110 may be a more flexible element than the outer gasket member 40. However, the gasket member 40 will virtually always be flexible, e.g., readily manually twisted or flexed, particularly in its length dimension. It will most always, however, not be as readily flexible as the inner gasket member 80 which may be sufficiently flexible as to be susceptible to manually rolling into a tight coil. Since the outer sealing means 110 can be expected to be more flexible than the outer gasket member 40, it may sometimes be referred to herein as a "flexible" strip, or the like.

For the outer gasket member 40, it is most often contemplated that the channel 45 will be centrally located along the width dimension of the outer gasket member 40. However, other positionings of the channel 45 may be useful. It will also be typical that the channel 45 penetrate through to about one-half of the thickness of the outer gasket member 40, such as has been shown in FIG. 2. However, the depth of the channel 45 can be varied to a greater or lesser depth.

Although the front and back faces 42, 41 of the outer gasket member 40, or the gasket sealing means 110, have been shown to be uneven, e.g., ribbed, it is contemplated that for some installations these may also be smooth surfaces. Moreover, as uneven surfaces, the unevenness may be provided by means other than ribbing, e.g., grooves cut into a smooth surface or a surface tread. Also, the ribs 43, 44, 113, 114 need not be parallel, or evenly spaced, to one another. For example, they can form a zig-zag type pattern. Where such surfaces are uneven, whether by ribs, tread or other means, they may generally be referred to herein for convenience simply as "uneven faces comprising elongated ribs".

For the inner gasket member 80, the hollow and flexible tube element 81 may be a fiber reinforced tube element, such as EPDM rubber (terpolymer elastomer of ethylene-propylene diene monomer) reinforced with a fiber such as of cotton, nylon or other fabric. By being flexible, it is also meant that the tube element 81 can be readily flexed under pressure, such as from a compressed gas, in the manner that an inner tube for an automobile tire can be flexed by the introduction to the tube of compressed gas. This tube element 81 may also be, or in addition be, a laminated tube element 81. In this construction, an inner laminate member, providing the inner element surface 83 of the tube element 81, can be a fluid tight member. Such can be provided by elastomeric materials of retarded gas permeability. These can include butyl rubber and halogenated butyl rubber, e.g., chlorinated butyl rubber.

The outer member of the laminate, i.e., the member contributing the outer element surface 84 of the hollow and flexible tube element 81, can then be of an elastomeric material resistant to conditions of the electrolytic cell. Such materials can include neoprene, the above-mentioned ethylene-propylene terpolymer, polytetrafluoroethylene, as well as elastomeric mixtures. It is also contemplated that the entire element 81, even of laminated construction, can all be of the same elastomeric material. For the inner gasket member 80, the foot 85 and the tube connector 87 can be of any material such as already mentioned hereinbefore as useful for the inner gasket member 80.

Although the inner gasket member 80 has been depicted as comprising both the hollow and flexible tube element 81 and the foot 85, it is contemplated to utilize an inner gasket member 80 that contains only the hollow tube element 81. Also, where a foot 85 is utilized, such can be of varying dimension. For example, the width of the foot 85 may extend so that the sides abut against the ribs 44 on the front face 42 of the outer gasket member 40. Furthermore, the bottom surface 86 of the foot 85 need not be a smooth surface, but itself may be uneven, e.g., ribbed.

The valve means 88 can be any of those means that are utilized to permit the flow of fluid, e.g., compressed air, into a flexible tube, but then serve to maintain the fluid under pressure in the tube. Use of a valve means 88 such as is typically employed with an inner tube of an automobile tire is contemplated. Thus, the valve means 88 may be such as can be readily manipulated to provide for escape of compressed fluid from the hollow and flexible tube element 81 when desired.

The separator member of the cell 10, as a diaphragm, may sometimes be referred to herein as a "diaphragm porous separator". For the diaphragm, a natural material such as asbestos fiber may be used in forming the diaphragm, or a synthetic material such as a synthetic fiber used in a synthetic, electrolyte permeable diaphragm can be utilized, or the diaphragm may be a combination of natural and synthetic material. The synthetic diaphragms generally rely on a synthetic polymeric material, such as polyfluoroethylene fiber as disclosed in U.S. Pat. No. 5,606,805 or expanded polytetrafluoroethylene as disclosed in U.S. Pat. No. 5,183, 545. Such synthetic diaphragms can contain a water insoluble inorganic particulate, e.g., silicon carbide, or zirconia, as disclosed in U.S. Pat. No. 5,188,712, or talc as taught in U.S. Pat. No. 4,606,805. Of particular interest for the diaphragm is the generally non-asbestos, synthetic fiber diaphragm containing inorganic particulates as disclosed in U.S. Pat. No. 4,853,101. The teachings of this patent are incorporated herein by reference.

Broadly, this diaphragm of particular interest comprises a non-isotropic fibrous mat wherein the fibers of the mat comprise 5–70 weight percent organic halocarbon polymer fiber in adherent combination with about 30–95 weight percent of finely divided inorganic particulates impacted into the fiber during fiber formation. The diaphragm has a weight per unit of surface area of between about 2 to about 12 kilograms per square meter. Preferably, the diaphragm has a weight in the range of about 3–7 kilograms per square meter. A particularly preferred particulate is zirconia. Other metal oxides, i.e., titania, can be used, as well as silicates, such as magnesium silicate and alumino-silicate, aluminates, ceramics, cermets, carbon, and mixtures thereof. Especially for this diaphragm of particular interest, the diaphragm may be compressed, e.g., at a compression of from about one to about six tons per square inch. It will be understood that the sealing means of the present invention is most desirably utilized in electrolytic cells that are diaphragm cells, but it is additionally contemplated for use in other cells that, for example, are chlor-alkali cells, or employed in the production of products as discussed herein.

I claim:

1. In an electrolytic cell, wherein an electrode assembly is contained in a walled enclosure having an outer wall member, the improvement in said enclosure comprising:
    a sealed outer wall member;
    a two-piece pneumatic gasket system sealing said outer wall member and consisting essentially of:
        an outer gasket member comprising an at least substantially solid, thick and elongated elastomeric strip element having front and back major faces, with said front face containing a channel along the length dimension of said strip element; and
        an inner gasket member comprising an elongated elastomeric strip member having an inflatable, hollow and flexible tube element extending in the length dimension of said strip member; with said inner gasket member situated in the channel of said outer gasket member.

2. The assembly of claim 1 wherein said outer gasket member comprises an elastomeric strip element having a durometer hardness within the range from about 20 to about 60 and said strip element comprises an elastomer resistant to the electrolyte of said cell.

3. The assembly of claim 2 wherein said elastomeric strip member comprises an elastomer selected from the group consisting of neoprene, ethylenepropylene terpolymer, polypropylene, natural rubber and mixtures of the foregoing.

4. The assembly of claim 1 wherein said outer gasket member elongated elastomeric strip element has a ratio of strip width to strip thickness on the order of about 3:1.

5. The assembly of claim 1 wherein said outer gasket member channel is approximately centrally located within said front face of said outer gasket member and said channel is recessed to within about one-half of the thickness of said outer gasket member.

6. The assembly of claim 1 wherein said outer gasket member front and back faces are uneven faces and said uneven faces comprise elongated ribs spaced apart one from the other along the length dimension of said faces.

7. The assembly of claim 1 wherein said outer gasket member is flanged and the flange extends outwardly away from a major face of said member at a side thereof.

8. The assembly of claim 1 wherein said outer gasket member has vulcanized joints and is in combination with a cathode flange.

9. The assembly of claim 1 wherein said system comprises a large outer gasket member in relation to a small inner gasket member and said inner gasket member is coextensive in length with said outer gasket member.

10. The assembly of claim 1 further comprising fluid flow inlet means connected with said inner gasket member hollow tube element with said fluid flow inlet means comprising a valve stem connected with said hollow tube element, and a fluid flow regulator valve contained within said valve stem.

11. The assembly of claim 1 wherein said inner gasket member hollow and flexible tube element is a fiber reinforced tube element.

12. The assembly of claim 1 wherein said inner gasket member hollow and flexible tube element is a laminated elastomeric tube element.

13. The assembly of claim 12 wherein said laminated elastomeric tube element comprises an outer laminate member and an inner laminate member, and said inner laminate member comprises an elastomer of retarded gas permeability.

14. The assembly of claim 13 wherein said inner laminate member contains an elastomer selected form the group consisting of butyl rubber, halogenated butyl rubber, and mixtures of the foregoing, and said outer laminate member contains an elastomeric material selected from the group consisting of neoprene, ethylene-propylene terpolymer, polytetrafluoroethylene, as well as mixtures of the foregoing.

15. An electrolytic cell for the production of one or more of chlorine, caustic soda, potassium hydroxide or sulfuric acid, or for salt splitting to regenerated acid and base values, or for electrolytic destruction of organic pollutants, or water electrolysis, or electro-regeneration of catalytic intermediates or electrolysis of sodium carbonate, wherein said cell has a diaphragm and contains the walled enclosure of claim 1.

16. The electrolytic cell of claim 15 wherein said diaphragm is a synthetic diaphragm comprising organic polymer fibers in adherent combination with inorganic particulates, which diaphragm is a non-isotropic fibrous mat comprising 5–70 weight percent of halocarbon polymer fiber in adherent combination with about 30–95 weight percent of finely divided inorganic particulates.

17. In an electrolytic cell, wherein an electrode assembly is contained in a walled enclosures said walled enclosure comprising an outer wall member sealed by a one-piece pneumatic gasket system of a thick and elongated, flexible elastomeric strip element having front and back major faces, and with an elongated and inflatable cavity within said strip element that extends in the length dimension of said strip element.

18. The assembly of claim 17 wherein said gasket member comprises a flexible elastomeric strip element having a durometer hardness within the range from about 20 to about 60, and said cavity extends completely throughout the length dimension of said elastomeric strip element.

19. The assembly of claim 18 wherein said flexible elastomeric strip member comprises an elastomer selected from the group consisting of neoprene, ethylenepropylene terpolymer, polypropylene, natural rubber and mixtures of the foregoing.

20. The assembly of claim 17 wherein said gasket member flexible elastomeric strip element has a ratio of strip width to strip thickness on the order of about 3:1, said gasket member front and back faces are uneven faces and said uneven faces comprise elongated ribs spaced apart one from the other along the length dimension of said faces.

21. The assembly of claim 17 wherein said gasket member is flanged and the flange extends outwardly away from a major face of said member at a side thereof.

22. The assembly of claim 17 wherein said gasket member has vulcanized joints and is in combination with a cathode flange.

23. The assembly of claim 17 further comprising fluid flow inlet means connected with said gasket member inflatable cavity, said fluid flow inlet means comprises a valve stem member connected to said inflatable cavity, and a fluid flow regulator valve contained within said valve stem.

24. An electrolytic cell for the production of one or more of chlorine, caustic soda, potassium hydroxide or sulfuric acid, or for salt splitting to regenerate acid and base values, or for electrolytic destruction of organic pollutants, or water electrolysis, or electro-regeneration of catalytic intermediates or electrolysis of sodium carbonate, wherein said cell has a diaphragm and contains the walled enclosure of claim 17.

25. The electrolytic cell of claim 24 wherein said diaphragm is a synthetic diaphragm comprising organic polymer fibers in adherent combination with inorganic particulates, which diaphragm is a non-isotropic fibrous mat comprising 5–70 weight percent of halocarbon polymer fiber in adherent combination with about 30–95 weight percent of finely divided inorganic particulates.

\* \* \* \* \*